(12) United States Patent
Yogata et al.

(10) Patent No.: US 6,308,829 B1
(45) Date of Patent: Oct. 30, 2001

(54) PHOTOGRAPHIC DEVICE SET

(75) Inventors: Kozue Yogata; Kazuhiro Nakanishi; Nobuaki Sugiyama; Yuichi Atarashi, all of Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/489,486

(22) Filed: Jan. 21, 2000

(30) Foreign Application Priority Data

Jan. 29, 1999 (JP) .................................................. 11-022676

(51) Int. Cl.[7] .................................................. B65D 85/38
(52) U.S. Cl. .............................................. 206/316.2; 396/6
(58) Field of Search ...................... 206/316.2, 819; 396/6, 25, 27, 29

(56) References Cited

U.S. PATENT DOCUMENTS

| | | | |
|---|---|---|---|
| 4,739,353 | * | 4/1988 | Heuer et al. ............ 206/316.2 |
| 4,766,451 | * | 8/1988 | Fujimura et al. ................ 396/6 |
| 4,804,984 | * | 2/1989 | Heuer et al. ............... 206/316.2 |
| 4,882,600 | * | 11/1989 | Van De Moere ............... 396/29 |
| 5,325,139 | * | 6/1994 | Matsumoto ........................ 396/6 |
| 5,337,099 | * | 8/1994 | Tasaka et al. .................... 396/6 |
| 5,738,211 | * | 4/1998 | Ichino et al. ............... 206/316.2 |
| 6,096,439 | * | 8/2000 | Bull et al. ......................... 206/819 |

FOREIGN PATENT DOCUMENTS 5-32268 * 2/1993 (JP) ................................. 206/316.2

* cited by examiner

*Primary Examiner*—Jim Foster
(74) *Attorney, Agent, or Firm*—Jordan B. Bierman; Bierman, Muserlian and Lucas (57) ABSTRACT

A photographic device set including: a photographic device having a shutter device, a camera lens, a diaphragm and a photographing operation section; a photographic film built in the photographic device in advance; and a packing material with which the photographic device is packed. In the photographic device set, the packing material has a transparent film and is provided with opaque portions at an area corresponding to the photographing operation section or to the camera lens of the photographic device.

11 Claims, 8 Drawing Sheets

PHOTOGRAPHIC DEVICE SET

BACKGROUND OF THE INVENTION

The present invention relates to a photographic device set wherein a photographic device which is loaded with an unexposed roll type photographic film in advance and is equipped with an exposure function for photographing is packed by a packing material.

A lens-fitted film unit is widely used as a convenient camera for simple photographing. This is a camera wherein a cartridge and an unexposed film are loaded in a unit main body equipped with at least a camera lens and a shutter, and it is one to operate a film-winding knob and a shutter-release button so that the unexposed film is exposed to an image of a subject. This is sold commonly at a film store.

On the lens-fitted film unit of this type, there are added a paper cover (outer box) formed in a book type with paper to protect a unit main body and a outer packing material to cover entire surface of the unit main body for convenience of transport and marketing.

As an outer packing material for the conventional lens-fitted film unit, there are used a non-transparent packing film containing an aluminum layer and a packing film made entirely of transparent plastics.

As a materiel of a paper cover for the conventional lens-fitted film unit, a coated paper, for example, is used.

In the case of an outer packing material for the conventional lens-fitted film unit, when a non-transparent packing film, for example, is used, it is difficult for a user to confirm an appearance and a design of the lens-fitted film unit covered by the outer packing material from the outside of the outer packing material, which has been a problem.

On the other hand, when a packing film made of transparent plastics is used as an outer packing material, it is possible to confirm total appearance of a lens-fitted film unit visually from the outside. Therefore, a shutter-release button, a film-winding knob or an electronic flash switch is operated accidentally by a thoughtless user when the lens-fitted film unit is displayed in a showroom, resulting in a problem that an image of a subject which is totally unrelated is exposed on a photographic film before a purchaser of the lens-fitted film unit photographs, which makes the purchaser disadvantageous.

However, in the case of a paper cover for the conventional lens-fitted film unit, it is formed with a coated paper whose surface is also printed totally. Therefore, texture and feeling owned by paper itself have not been used.

In the case of a paper cover employing paper other than a coated paper, quality of the paper cover itself is sometimes deteriorated by moisture absorbent, which has been a problem also on an aspect of storage.

SUMMARY OF THE INVENTION

The invention has been achieved in view of the circumstances stated above, and it provides a photographic device set wherein constitution of outer packing materials is improved, the inside of the packing materials can easily be observed visually, a design of the photographic device can be confirmed by a user before purchasing, and a purchaser does not suffer from disadvantage owing to less fear of a piece of mischief and erroneous operations. Further, it is possible to reduce cost of packing materials. It is also possible to make packing materials for various types of photographic device products to be common to further reduce cost. Furthermore, a photographic device set which is excellent in terms of environmental impact can be provided.

In addition, the invention provides a photographic device set wherein constitution of an outer cover and outer packing materials is improved, a range of design inventions is broad, decency and appearance are excellent, a printed portion on the surface can be protected, and an outer cover excellent in preservability is furnished.

An example of the invention is represented by the following.

(1) A photographic device set comprising: a photographic device having a shutter device, a camera lens, a diaphragm and a photographing operation section; a photographic film built in the photographic device in advance; and a packing material with which the photographic device is packed, in which the packing material has a transparent film and is provided with opaque portions at an area corresponding to the photographing operation section or to the camera lens.

Another example of the invention is represented by the following.

(2) A method of packing a photographic device comprising steps of: covering the photographic device with a packing material made of a transparent film having therein an opaque portion; and melting a portion of the packing material to be melted and pasted for packing; in which a photographic film is loaded in the photographic device in advance, the portion to be melted and pasted for packing is made to be the rear side of the photographic device or the bottom side of the photographic device, and an area corresponding to the photographing operation section or to the camera lens is covered by the opaque portion of the packing material.

Further example of the invention is represented by the following.

(3) A lens-fitted film unit having a unit main body which is loaded with an unexposed photographic film and is equipped with at least a function of winding the photographic film and a function of photographing an image of a subject, and having a paper cover which covers at least a portion of the unit main body, wherein the paper cover is formed with materials including kraft paper.

Since the paper cover which covers at least a part of the unit main body is made of materials including kraft paper in the example mentioned above, it is possible to provide a lens-fitted film unit wherein a range of design inventions is broad, and decency and appearance such as texture and feeling are excellent.

Still another example of the invention is represented by the following.

(4) The lens-fitted film unit according to the above item (3), wherein a surface protective layer is coated on the surface of the paper cover.

Since the surface protective layer is coated on the surface of the paper cover in the example mentioned above, it is possible to provide a lens-fitted film unit wherein the surface can be protected, moisture absorbent is prevented, decency and appearance can be maintained, and preservability is excellent.

Still another example of the invention is represented by the following.

(5) The lens-fitted film unit according to the above item (3), wherein a surface protective layer is coated on the surface of the paper cover, except a margin to paste up.

Since the surface protective layer is coated on the surface of the paper cove except a margin to paste up in the example mentioned above, it is possible to provide a lens-fitted film unit wherein the surface can be protected, moisture absorbent is prevented, decency and appearance can be maintained, and preservability is excellent. In addition, adhesion strength by adhesives can be increased.

Still another example of the invention is represented by the following.

(6) The lens-fitted film unit according to either one of the above items (3)–(5), wherein required information concerning the unit main body is printed on the paper cover.

Since the required information concerning the unit main body is printed on the paper cover in the lens-fitted film unit described in either one of the above items (3)–(5) in the example mentioned above, it is possible to provide a lens-fitted film unit wherein a portion where the required information is printed can be protected by the surface protective layer, moisture absorbent is prevented, and preservability is excellent.

Still another example of the invention is represented by the following.

(7) The lens-fitted film unit according to either one of the above items (3)–(6), wherein a portion where required information is printed by a laser marker is displayed on the paper cover.

Since the portion where required information is printed by a laser marker is displayed in the lens-fitted film unit described in either one of the above items (3)–(6) in the example mentioned above, it is possible to simplify print processing of character information among the required print information by a simple means to use a laser marker.

Still another example of the invention is represented by the following.

(8) The lens-fitted film unit according to either one of the above items (3)–(7), wherein nothing is printed on the front side of the paper cover.

In the example stated above, texture and feeling can be exhibited on the front side of the paper cover.

Still another example of the invention is represented by the following.

(9) A lens-fitted film unit having therein a unit main body wherein an unexposed photographic film is loaded and at least a photographing operation section for the photographic film and a camera lens are provided, and an outer packing material formed with a transparent film which covers the outer side of the unit main body so that it may be observed visually from the outside, under the condition that printed portions which make it impossible to observe each section visually are provided at areas corresponding to either one of the photographing operation section and the camera lens, or to both of them.

Since the outer side of the unit main body is covered by the outer packing material made of transparent film wherein printed portions which make it impossible to observe each section visually are provided at areas corresponding to either one of the photographing operation section and the camera lens, or to both of them, in the example stated above, it is possible to provide a lens-fitted film unit wherein a range of design inventions for outer packing materials is broad, and a purchaser does not suffer from disadvantage owing to less fear of a piece of mischief and erroneous operations.

Still another example of the invention is represented by the following.

(10) The lens-fitted film unit according to the above item (9), wherein the photographing operation section is at least one of a release button, a film-winding knob and an electronic flash switch all provided on the unit main body.

In the example stated above, it is possible to provide a lens-fitted film unit wherein a fear of a piece of mischief and erroneous operations for a release button, a film-winding knob or an electronic flash switch is made less and thereby a purchaser does not suffer from disadvantage.

Still another example of the invention is represented by the following.

(11) The lens-fitted film unit according to either one of the above items (9) and (10), wherein the outer packing material covers the unit main body under the condition that a portion to be melted and pasted for packing is positioned on the rear side of the unit main body.

Since a portion to be melted and pasted for packing is positioned on the rear side of the unit main body in the example stated above, a portion to be melted and pasted for packing is not positioned on the surface side of the unit main body, and due to this, appearance and decency of the lens-fitted film unit itself can be improved, and visibility of the surface side of the unit main body can be improved.

Still another example of the invention is represented by the following.

(12) The lens-fitted film unit according to either one of the above items (9)–(11), wherein a printed portion is provided on a portion to be melted and pasted for packing of the outer packing material, and a notch is formed on the printed portion.

In the example stated above, a position of the notch can be noticed immediately to offer convenience to a user.

DETAILED DESCRIPTION OF THE INVENTION

An embodiment of the lens-fitted film unit related to the invention will be explained in detail as follows, referring to the drawings.

A photographic device set of the invention has therein a photographic device, a photographic film built in the photographic device in advance and packing materials to pack the photographic device. The photographic device set has therein a shutter device, a camera lens, a diaphragm and a photographing operation section. The packing material has a transparent film, and the packing material is provided with an opaque portion which makes the photographing operation section and the camera lens to be invisible at an area corresponding to the photographing operation section or the camera lens.

Incidentally, the photographic device is preferably a lens-fitted film unit loaded with a film in advance, but it may also be an ordinary camera loaded with a film in advance.

It is preferable that the photographic device set has outer packing members such as a paper cover and a label. It is preferable that product information such as a product name, the number of exposures, a type of the film and a type of the photographic device are described on outer packing members such as a paper cover, a label and a body of the photographic device. In other words, when product information described on the photographic device is made to be visible from the outside even when the photographic device is packed by packing materials, the product information does not need to be described on the packing material, resulting in cost reduction and environment-friendly effect. Incidentally, it is possible to use a coated paper or a kraft paper as a paper cover.

When describing product information on an outer packing member of a photographic device or on a body of a photographic device as a bar code, it is preferable to pack so that the bar code can be read by a bar code reader from the outside of packing materials through transparent portion of packing material.

Further, when images and patterns are described on an outer packing member or on a body of a photographic device, it is preferable that the photographic device is packed so that the images and the patterns may be visible from the outside through transparent portion of packing material.

The photographing operation section means a portion on the photographic device to be used by a photographer for photographing, and it preferably means a shutter-release button, a film-winding knob and an electronic flash switch.

An opaque portion provided on a packing material may be provided either by printing on a transparent film or by sticking an opaque seal on a transparent film. However, providing the opaque portion through printing is preferable because manufacturing cost can be reduced and dust generated is less to be excellent in terms of environmental matters.

It is further possible to describe product information on the opaque portion of a packing material. When describing product information on the opaque portion, it is possible to make packing materials to be common by indicating common information concerning plural types of photographic devices, which is preferable because cost reduction can be achieved and delivery time can be shortened. In this case, it is possible to indicate the independent information of the photographic device at a portion of the photographic device where the independent information can be seen through the transparent portion of the packing material.

Further, it is preferable that a packing material is melted and pasted at its package melting portion to be melted and pasted for packing, because it makes manufacturing to be easy, and the package melting portion is positioned on the rear side or the bottom side of the photographic device so as to be preferable from the viewpoint of external appearance. When no product information is described on a packing material, it is preferable that a portion corresponding to one where product information of the photographic device is described is not covered by the portion to be melted and pasted for packing. The portion to be melted and pasted for packing may be provided either at the central portion or at the edge portion on each of the rear surface side and the bottom surface side.

It is preferable that a packing material is made of a transparent film, and vapor permeability of the transparent film representing a raw material of the packing material is between 0.3 $g/m^2$ and 2 $g/m^2$. It is further preferable that the vapor permeability is between 0.3 $g/m^2$ and 1 $g/m^2$. Here, it is preferable that the vapor permeability is the value measured in accordance with JIS-K-7129-1992. It is further preferable that the transparent film is composed of a plurality of layers. When the transparent film is configured with plural layers, it is preferable to have a layer, which has low vapor permeability, between the most outer layer and the most inner layer. Further, it is also possible that the layer, to which printing is applied, is provided between the most outer layer and the most inner layer. The preferable material for the transparent film is such as a polyethylene terephthalate (PET), a ceramic-evaporated polyethylene terephthalate, a silicon-evaporated polyethylene terephthalate, a glass-evaporated polyethylene terephthalate, polypropylene (PP), polyvinyl alcohol (PVA), polyethylene (PE), a EVA-PE, and a LLD-PE. The packing material may contain UV preventing agents. A transparent film of the packing material may also be colored as far as the transparent film is transparent enough so that contents are visible. A material which blocks a part of visible light or a certain wavelength zone may be made to be a packing material so that it can resist even when it is exposed to sunlight in the open air.

Figure 15:
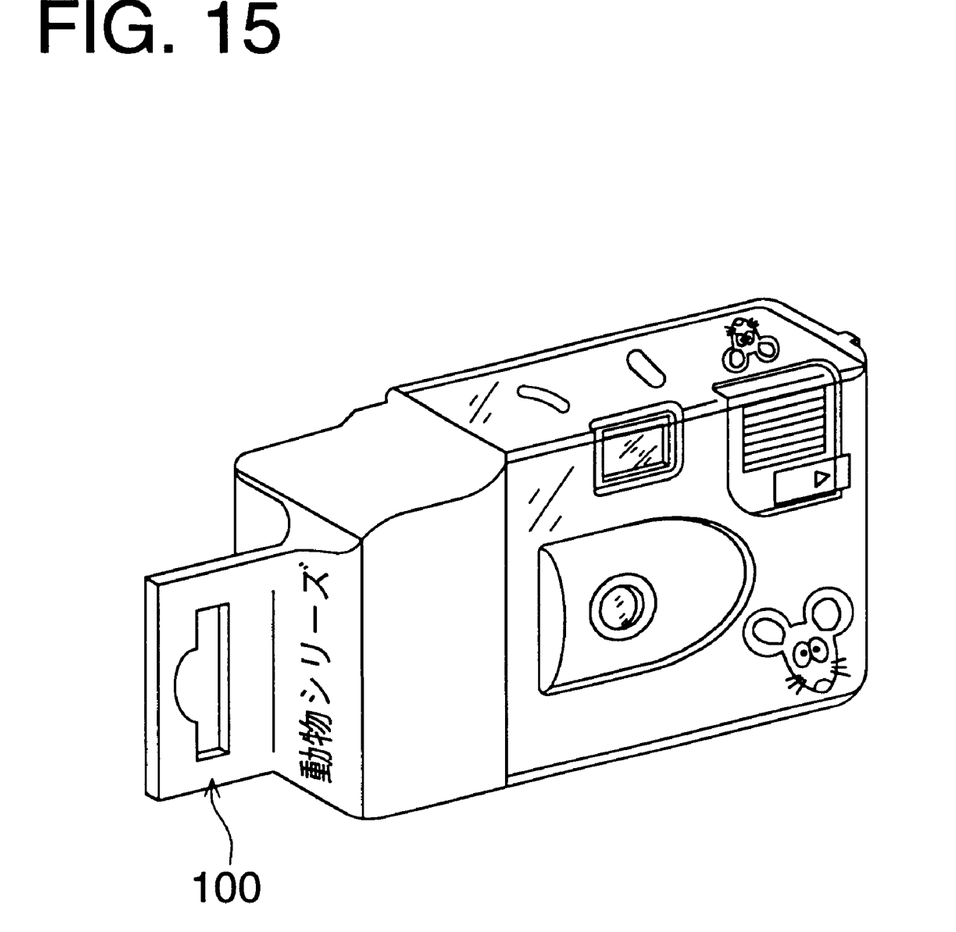
FIG. 15 is a perspective view showing a lens-fitted film unit packed with outer packing materials to be hung down.

It is also possible that a packing material is not composed only of a transparent film, and a part of the packing material is reinforced by paper or plastic, or the packing material is provided with hanging section 100 to be hung down in the store as shown in FIG. 15.

As a method of packing the photographic device, there is given a method wherein the photographic device is covered by a packing material formed with a transparent film having an opaque portion, and then, a portion to be melted and pasted for packing of the packing material is superposed to be melted and pasted for packing. In this case, packing is conducted so that the portion to be melted and pasted for packing is made to be on the rear surface side or the bottom surface side of the photographic device, and an opaque portion of the packing material covers an area corresponding to a photographing operation section or a camera lens.

Incidentally, it is possible to provide an opaque portion through printing or seal pasting after packing the photographic device with a transparent film without using a transparent film having an opaque portion in advance. It is also possible that a bag-shaped member is formed with a transparent film, then, a photographic device is put in bag-shaped member, and its entrance is closed through melting and pasting.

(Embodiment 1)

FIGS. 1–5 show a lens-fitted film unit of the present Embodiment 1.

Figure 1:
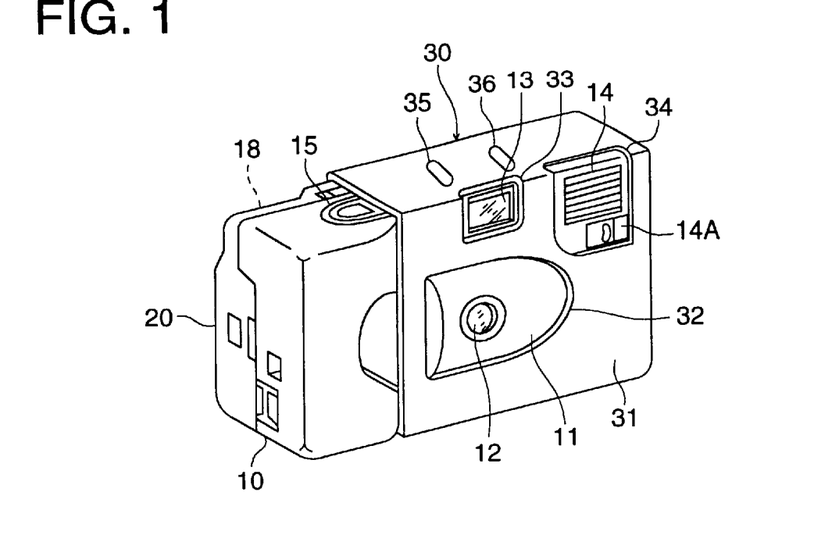
FIG. 1 is a perspective view showing a lens-fitted film unit in Embodiment 1 of the invention.

FIG. 1 is a perspective view showing appearance of the lens-fitted film unit which is composed of unit main body 10 which is mostly in a shape of a rectangular parallelepiped and of paper cover (outer box) 30 formed with a raw material including kraft paper. The kraft paper is one made of pulp which is a kind of chemical pulp prepared through a cooking method.

Figure 2:
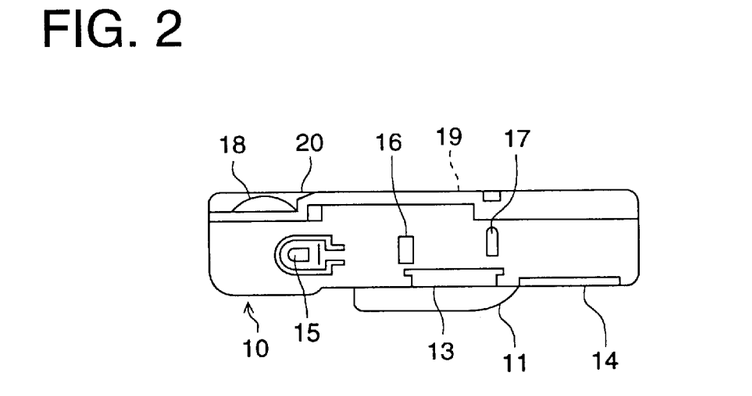
FIG. 2 is a top view of a lens-fitted film unit in Embodiment 1 of the invention from which a paper cover is removed.
Figure 3:
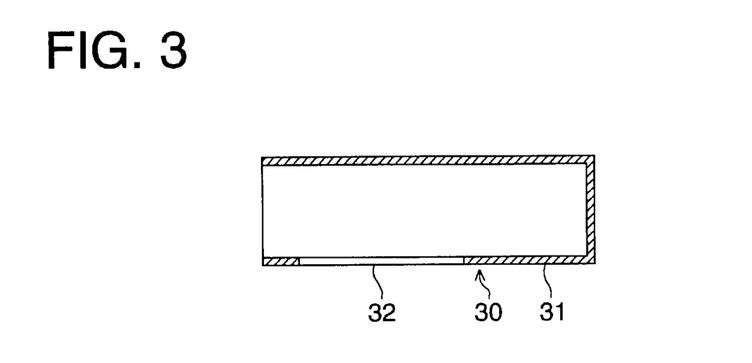
FIG. 3 is a central and horizontal sectional view of the paper cover in a lens-fitted film unit in Embodiment 1 of the invention.
Figure 4:
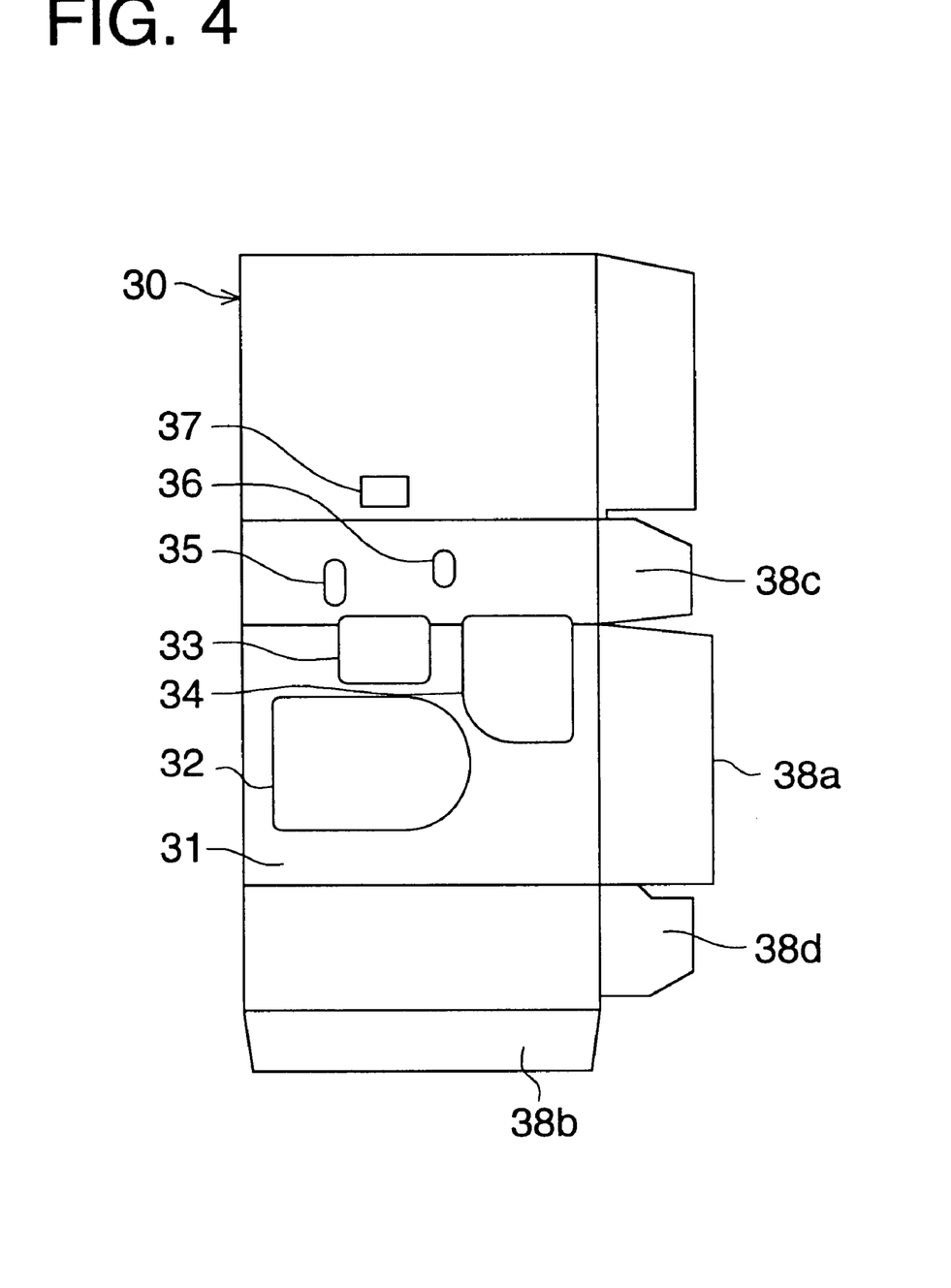
FIG. 4 is a development of the paper cover in a lens-fitted film unit in Embodiment 1 of the invention.
Figure 5:
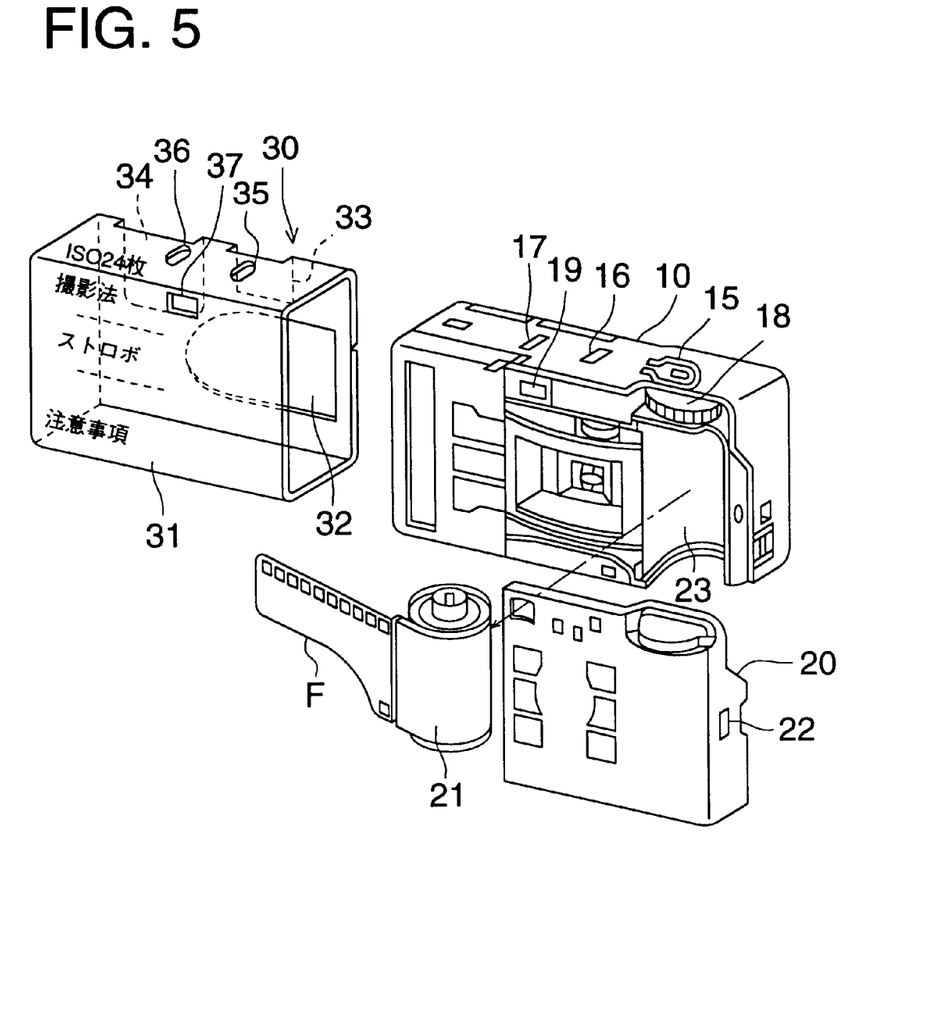
FIG. 5 is a schematic exploded perspective view of the unit main body and the paper cover in a lens-fitted film unit in Embodiment 1 of the invention.

FIG. 2 is a top view of unit main body 10, FIG. 3 is a central sectional view of paper cover 30, FIG. 4 is a development of paper cover 30, and FIG. 5 is a schematic exploded perspective view of unit main body 10 and paper cover 30.

On the front side (surface) of unit main body 10, there are provided camera lens 12 incorporated in lens mount 11, finder window 13, and electronic flash unit 14, while on the top side thereof, there are provided release button 15 for a shutter, film counter window 16 and electronic flash charging pilot lamp 17, and on the back surface (rear surface) side, there are provided film-winding knob 18 for film F, finder eye-piece 19 and back lid 20.

Paper cover 30 is formed with a raw material including kraft paper to have folding portions shown in FIG. 4, and it is formed to be in a book shape by forming after applying paste on margins to paste up 38a, 38b, 38c and 38d as shown in FIG. 4.

On positions of paper cover 30 each corresponding to each element of the unit main body 10, there are formed through holes (32, 33, 34, 35, 36 and 37). Through these through holes (32, 33, 34, 35, 36 and 37), there are protruded or exposed lens mount 11, finder window 13, electronic flash unit 14, film counter window 16, electronic flash charging pilot lamp 17, and finder eye-piece 19.

Namely, on the front surface side 31 of the paper cover 30 which covers the surface of unit main body 10, there are formed large through hole 32 through which the lens mount 11 is protruded, through hole 33 which makes it possible to see through finder window 13, and through hole 34 through which electronic flash unit 14 and electronic flash switch 14A are exposed to the outside.

On the paper cover 30, there are printed necessary pieces of information concerning the unit main body 10, namely how to photograph with the unit main body 10, how to use electronic flash unit 14 and precautions, as shown in FIG. 5 Incidentally, in the example, nothing is printed on front surface side 31 for the purpose of offering texture and feeling.

Further, on each surface other than margins to paste up 38a–38d on the printed paper cover 30, there is coated surface protective layer 41, as shown in FIG. 4. This is to strengthen the adhesive strength in the case of sticking the margins to paste up 38a–38d. Incidentally, when the adhesive strength can be secured sufficiently, it is also possible to provide surface protective layer 41 also on the margins to paste up 38a–38d.

As the surface protective layer 41, mat varnish which is thinner than ordinary varnish, for example, is used.

Figure 6:
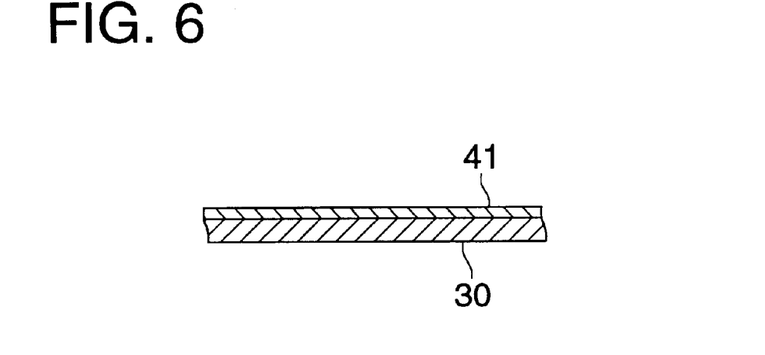
FIG. 6 is a partially enlarged sectional view of the paper cover in a lens-fitted film unit in Embodiment 1 of the invention.
Figure 7:
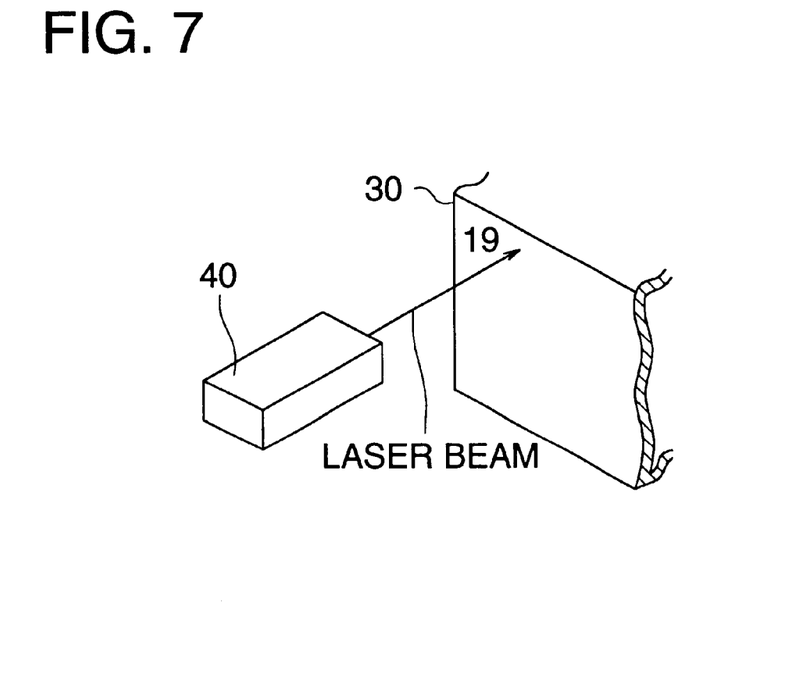
FIG. 7 is a schematic view showing print processing by a laser marker for the paper cover in a lens-fitted film unit in Embodiment 1 of the invention.

With regard to the printing section for character information which is changed periodically such as an expiration date and a bar code, among the aforesaid necessary information, print processing is conducted through irradiation of a laser beam of laser marker 40 as shown in FIG. 6, for example, after mounting paper cover 30 on unit main body 10. Incidentally, even for character information other than the character information changed periodically, printing through irradiation of a laser beam may also be conducted.

Since paper cover 30 accommodating unit main body 10 is formed with a raw material including kraft paper in the lens-fitted film unit of the present Embodiment 1, it is possible to obtain a lens-fitted film unit which is excellent also in decency and appearance such as texture and feeling.

Further, since surface protective layer 41 is coated on the surface of paper cover 30, it is possible to achieve protection of the surface of the paper cover 30, to prevent moisture absorbent and thereby to maintain decency and appearance for a long time, and to store a lens-fitted film unit for a long time.

Further, since a portion where necessary information concerning the unit main body 10 is printed on the paper cover is also protected, it is possible to prevent moisture absorbent and thereby to maintain clearness of the printed information.

Further, by forming surface protective layer 41 with mat varnish which is thinner than ordinary varnish, for example, it is possible to achieve protection and moisture absorbent on the surface without deteriorating texture and feeling owned by paper itself.

Since it is possible to display, by a simple means to use laser marker 40, the character information changed periodically among printing information, it is possible to simplify the print processing by the amount equivalent to that character information.

(Embodiment 2)

FIGS. 8–12 show a lens-fitted film unit in Embodiment 2 of the invention.

Figure 8:
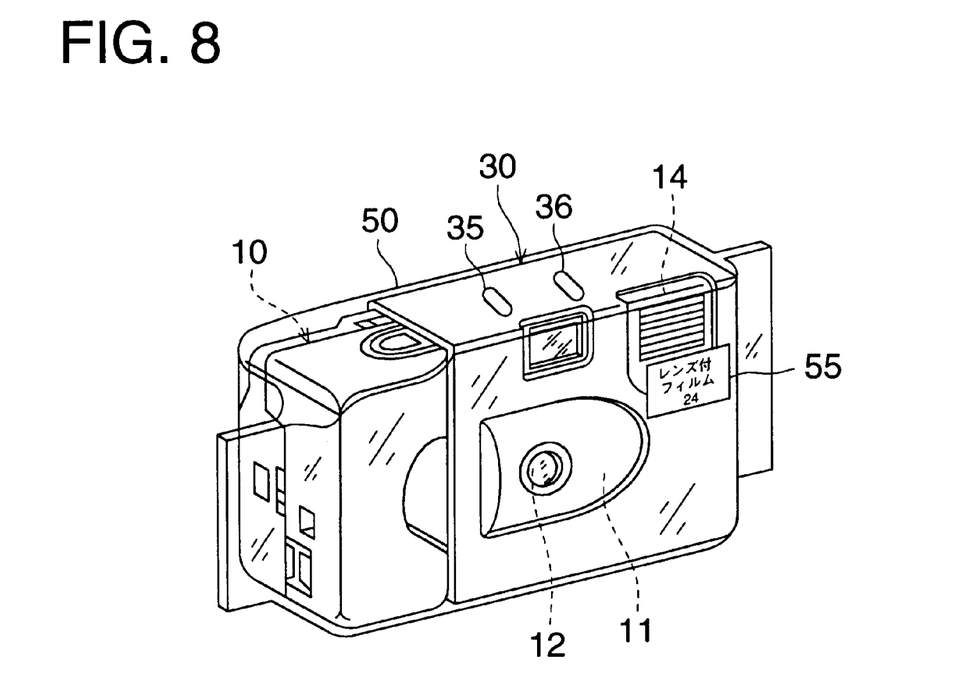
FIG. 8 is a perspective view showing a lens-fitted film unit in Embodiment 2 of the invention.

The lens-fitted film unit in the present embodiment 2 is characterized in that outer packing material 50 which is formed by a transparent film and covers outer surfaces of the unit main body 10 and paper cover 30 totally is added in addition to the structure of the unit main body 10 and paper cover 30.

With regard to a material of the outer packing material 50, there is used a transparent film wherein ceramic is vaporized on a PET (polyethylene terephthalate) film and moisture resistance is better than PET itself.

On the portion of the outer packing material 50 corresponding positionally to the electronic flash switch 14A, there is provided printed portion 55 which makes the electronic flash switch 14A invisible from the outside as shown in FIG. 8. On the printed portion 55, there is provided printing such as, for example, "lens-fitted film unit, 24 exposures". In addition to this, it is possible to put a price and a manufacture number of the lens-fitted film unit in the form of characters or bar codes.

Figure 9:
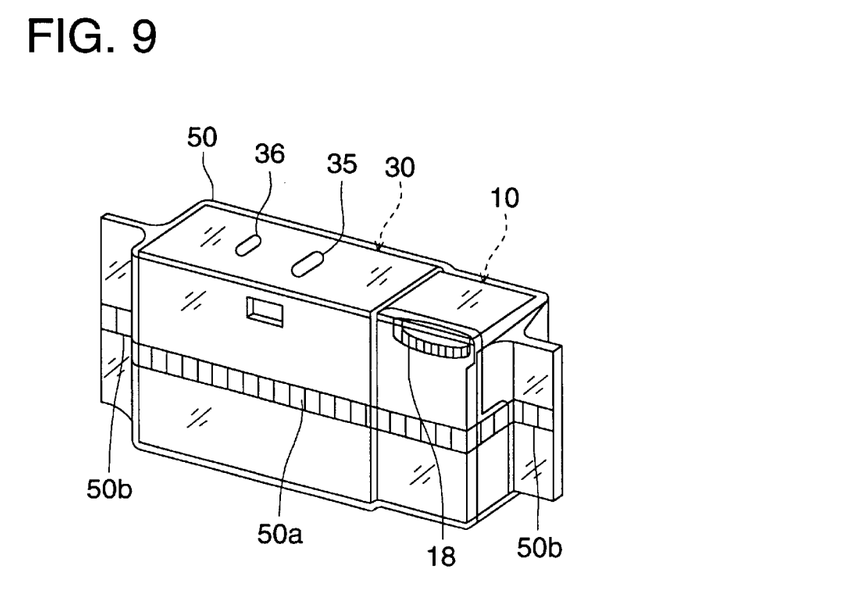
FIG. 9 is a perspective view of a lens-fitted film unit in Embodiment 2 of the invention viewed from its rear side.
Figure 10:
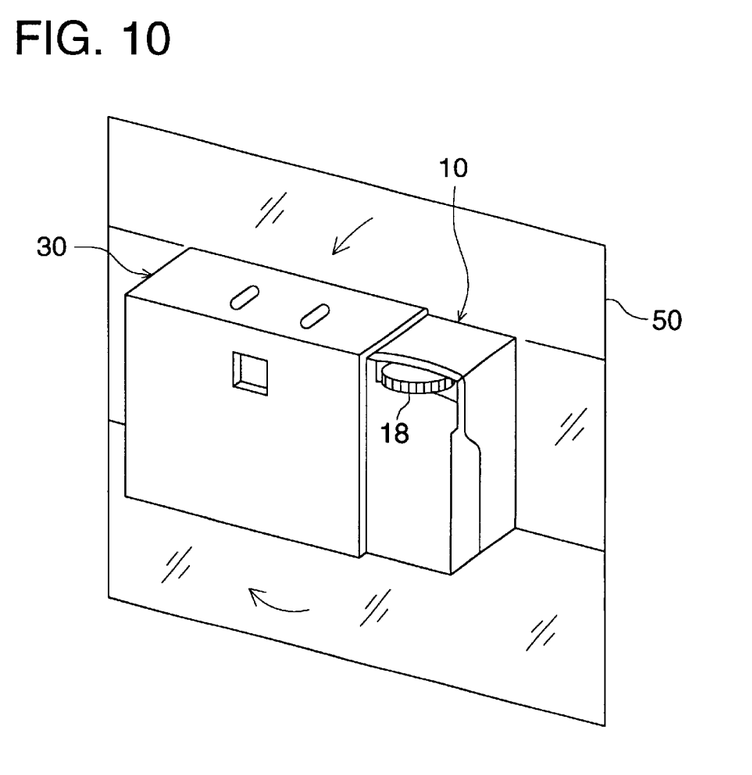
FIG. 10 is a schematic view of a packing process by outer packing materials in Embodiment 2 of the invention.

In packing of unit main body 10 and paper cover 30 with the outer packing material 50, folding processing and melting and pasting processing are conducted so that melting and pasting section for packing 50a extending in the longitudinal direction of the outer packing material 50 may be positioned at the rear surface side (the side opposite to camera lens 12) of the unit main body 10 as shown in FIGS. 9 and 10, to cover the unit main body 10 and the paper cover 30 totally. The lateral side of the outer packing material 50 is melted and pasted at the melting and pasting section for packing 50b.

In the lens-fitted film unit in Embodiment 2, the outer packing material 50 is formed with the aforesaid transparent film excellent in moisture resistance and camera lens 12 on the surface side is made not to be covered by melting and pasting section for packing 50a. Therefore, the unit main body 10 looks more attractive, and a range of design inventions is broad, which is an advantageous point.

Since a portion corresponding positionally to the electronic flash switch 14A is hidden by the printed portion 55, it is possible to reduce fear of a piece of mischief and erroneous operations of electronic flash switch 14A, and to prevent disadvantages for a purchaser.

Figure 11:
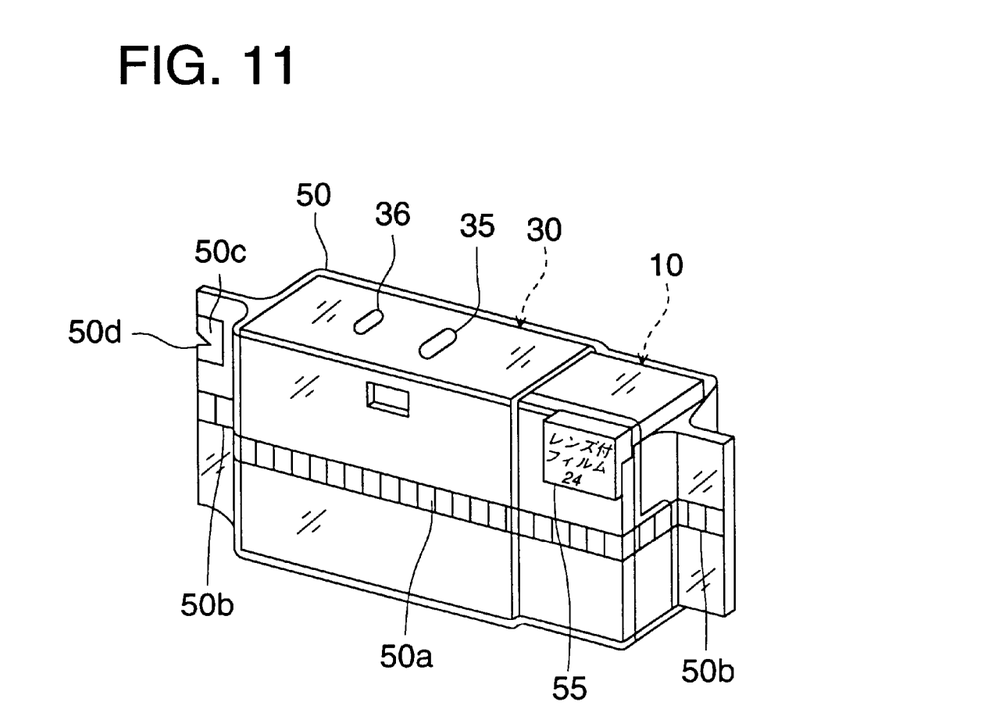
FIG. 11 is a perspective view showing a lens-fitted film unit wherein a printed portion is provided on outer packing materials at the position of a film-winding knob in Embodiment 2 of the invention.
Figure 12:
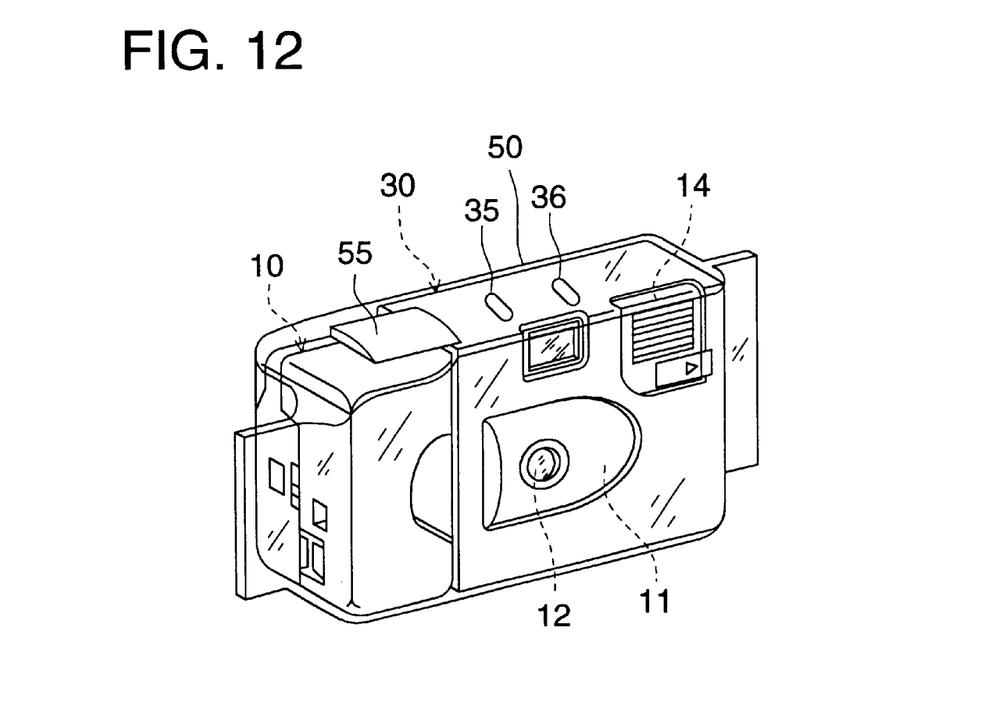
FIG. 12 is a perspective view showing a lens-fitted film unit wherein a printed portion is provided on outer packing materials at the position of a release button in Embodiment 2 of the invention.

With regard to the position of the printed portion 55, a position in front of camera lens 12, a position to cover film-winding knob 18 shown in FIG. 11 and a position covering release button 15 as shown in FIG. 12 in addition to that shown in FIG. 8 are acceptable, and in all cases, it is possible to avoid a piece of mischief for film-winding knob 18 or release button 15 which is originally unnecessary, to reduce concern of erroneous operations, and to avoid the disadvantage described in the conventional example for a purchaser.

Since melting and pasting section for packing 50*a* is indicated on the rear surface side of the unit main body 10 and paper cover 30 in the lens-fitted film unit in the present embodiment 2, it is possible to make prints or print processing for a manufacturing number or an expiration date, for example, to be provided on the rear surface side of paper cover 30 or on the side surface to be at the position which is not covered by the melting and pasting section for packing 50*a* or the melting and pasting section for packing 50*b*, to be observed easily, thereby it is possible to make product control to be convenient and to improve service for users.

By printing on two steps, it is possible to print on a small space.

Figure 13:
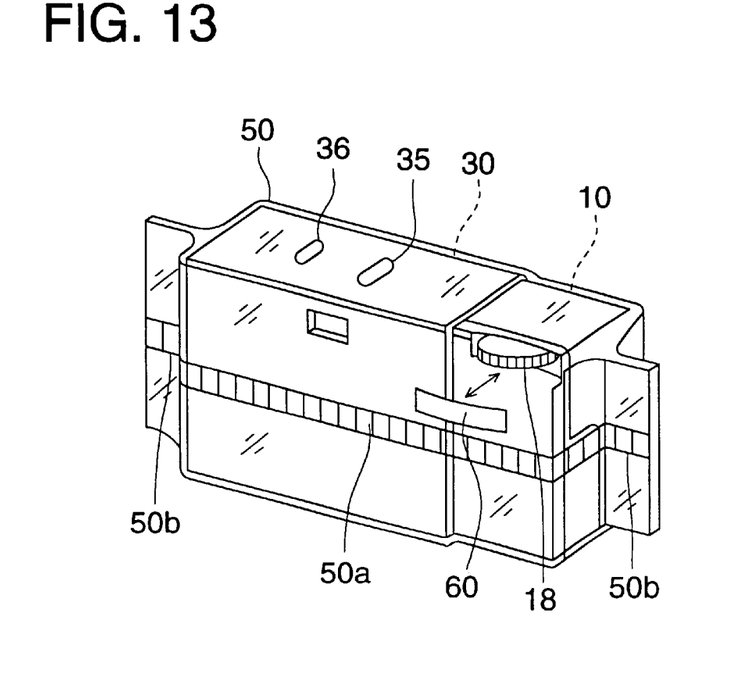
FIG. 13 is a perspective view showing an applied example of a lens-fitted film unit in Embodiment 2 of the invention.

FIG. 13 shows an applied example of the present embodiment 2, and it is one wherein in the lens-fitted film unit in the present embodiment 2, small-sized seal flake 60 like a sack of wet tissue which can be pasted and peeled repeatedly is pasted on the position corresponding positionally to the film-winding knob 18 on the outer packing material 50 to cover the film-winding knob 18, so that it is possible to photograph with the lens-fitted film unit while the unit main body 10 is accommodated in the outer packing material 50, by peeling the seal flake 60 to expose and turn the film-winding knob 18 when wanting to photograph. Due to this, it is possible to photograph scenery and persons outdoors in a rainy day, for example, without wetting camera lens 12.

Figure 14:
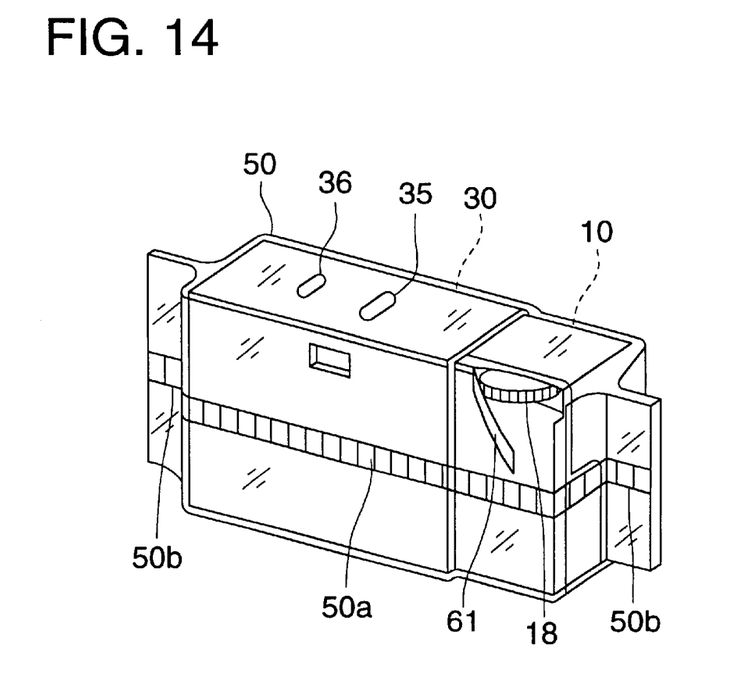
FIG. 14 is a perspective view showing another applied example of a lens-fitted film unit in Embodiment 2 of the invention.

As shown in FIG. 14, in the lens-fitted film unit in the present embodiment 2, breakable broken piece 61 is provided on the position corresponding positionally to the film-winding knob 18 on the outer packing material 50, so that it is possible to photograph with the lens-fitted film unit while the unit main body 10 is accommodated in the outer packing material 50, by breaking the broken piece 61 to expose and turn the film-winding knob 18 when wanting to photograph. Even in that case, it is possible to photograph scenery and persons outdoors in a rainy day, for example, without wetting camera lens 12.

Further, as shown in FIG. 11, it is possible to make cut end 50*d* to be observed easily by providing printed portion 50*c* on a part of melting and pasting section for packing 50*b* and by forming the cut end 50*d* on the printed portion 50*c*, for making opening of outer packing material 50 to be easy.

As stated above, the invention makes it possible to provide a lens-fitted film unit wherein a range of design inventions is broad, decency and appearance are excellent, moisture absorbent on the surface of printed portion is prevented, and preservability is excellent.

Further, the invention makes it possible to provide a lens-fitted film unit wherein a range of design inventions for outer packing materials is broad, decency and appearance are excellent, fear of a piece of mischief and erroneous operation is reduced and no disadvantage is given to a purchaser.

Disclosed embodiment can be varied by a skilled person without departing from the spirit and scope of the invention.

What is claimed is:

1. A photographic device set comprising:

a photographic device having a shutter device, a camera lens, a diaphragm and a photographing operation section;

a photographic film built in said photographic device in advance; and a packing material with which said photographic device is packed, wherein said packing material includes a transparent film for showing at least a part of said photographic device, and is provided with an opaque portion at an area corresponding to at least one of said photographing operation section and said camera lens and said opaque portion is provided on said transparent film by printing.

2. The photographic device set of claim 1, wherein said packing material is composed of a transparent film.

3. The photographic device set of claim 1, wherein said opaque portion is provided by pasting an opaque seal onto said transparent film.

4. The photographic device set of claim 1, wherein said photographic device is a lens-fitted film unit.

5. The photographic device set of claim 1, wherein said photographing operation section is at least one of a shutter-release button, a film-winding knob and an electronic flash switch.

6. The photographic device set of claim 1, wherein said packing material is melted and pasted at a package melting portion of said packing material; and said package melting portion is positioned on one of a rear side of said photographic device and a bottom side of said photographic device.

7. The photographic device set of claim 1, wherein said transparent film is a material in which ceramic or silicon is evaporated on a polyethylene terephthalate film.

8. The photographic device set of claim 1, wherein said photographic device comprises a paper cover.

9. The photographic device set of claim 8, wherein said paper cover is composed of a kraft paper.

10. The photographic device set of claim 1, wherein all portions of said photographic device is covered by said transparent film of said packing material so that any portion of said photographic device is not exposed outside said packing material.

11. The photographic device set of claim 1 wherein at least a part of said opaque portion is provided by pasting an opaque seal onto said transparent film.

* * * * *